March 31, 1942.         G. W. ALEXANDER                2,277,897
                        BATTERYLESS FLASHLIGHT
                        Filed Sept. 11, 1941
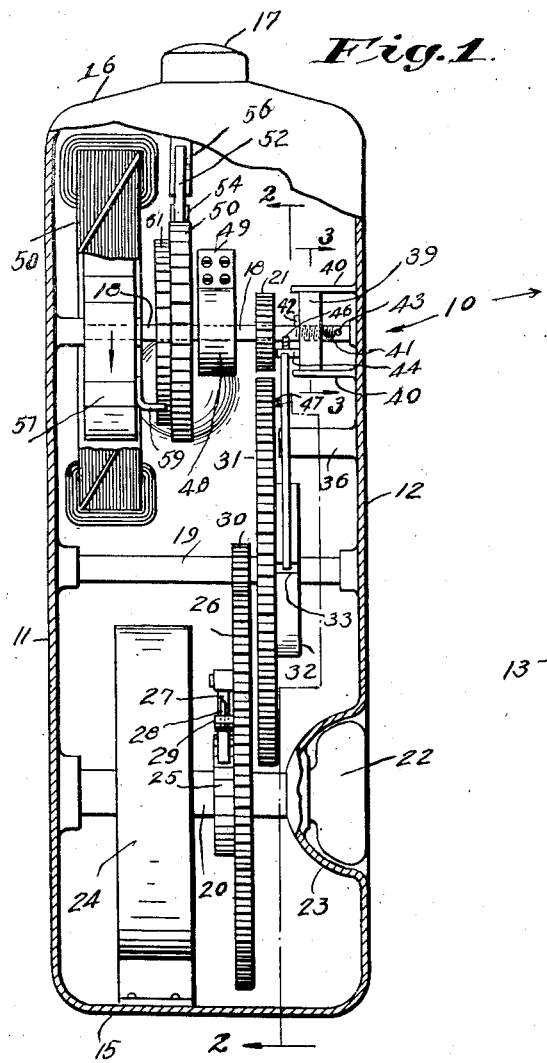
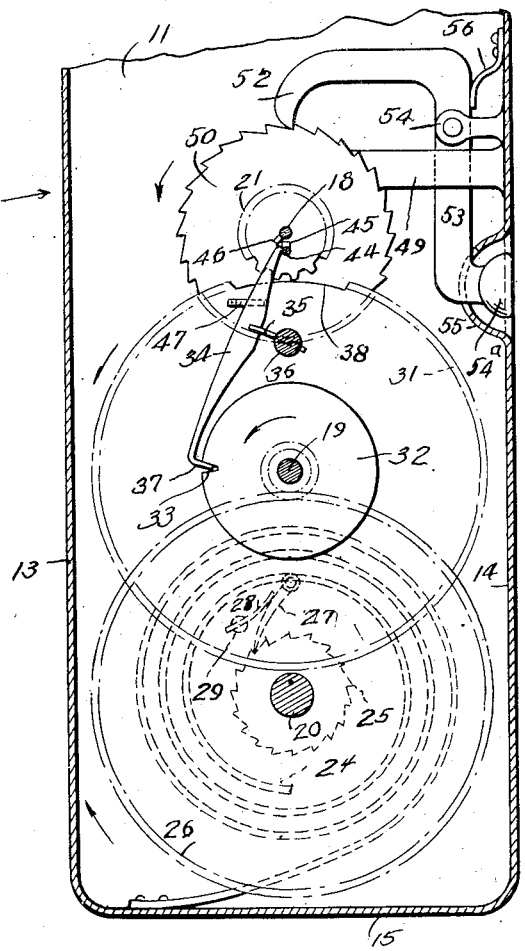
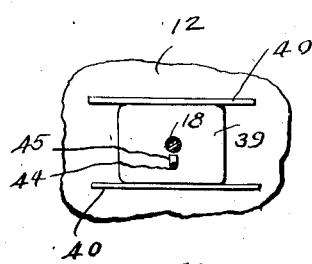
Inventor
George W. Alexander
By James C. Hamilton
Attorney Patented Mar. 31, 1942

2,277,897

UNITED STATES PATENT OFFICE 2,277,897

BATTERYLESS FLASHLIGHT

George W. Alexander, Boston, Mass.

Application September 11, 1941, Serial No. 410,414

3 Claims. (Cl. 240—10.5)

My present invention relates to flashlights and more particularly to batteryless flashlights which are operated by spring motors.

In my present invention, I have designed a batteryless flashlight having an intermittent main drive. This main drive energizes a generator drive spring which maintains the generator rotor in continuous motion as long as the finger release button is held down, or until the main spring of the main drive mechanism has run down which may be of considerable duration depending upon the design of the mechanism. The action of the flashlight is practically instantaneous, and after the main spring of the main drive has been unwound, it is possible to rewind it again very quickly to repeat the cycle.

The utility of such a device is quite apparent as it is readily seen that such a device may be used under conditions where it may be impossible to obtain the conventional dry batteries, or under conditions where dry batteries would deteriorate quickly.

It will therefore be seen that the principal object of my improved batteryless flashlight is to provide a continuous moving generator the direct drive of which is intermittently energized from a main driving mechanism;

Another object is a batteryless flashlight capable of producing instant illumination when the release button is pressed;

Still another object is an improved direct generator rotor shaft which is reversible in direction of rotation for the purpose of charging the generator rotor spring and rewinding said spring while the said rotor moves in continuous rotation in one direction, and Other objects and novel features comprising the construction and operation of my invention will be apparent as the description of the same progresses.

In the drawing illustrating the preferred embodiment of my invention:

Fig. 1 is a side elevation of the device, as viewed from inside the casing, the casing having been broken away as indicated in cross-section, the upper portion being shown unbroken;

Fig. 2 is a cross-section taken on line 2—2 of Fig. 1, the upper portion being broken off, and Fig. 3 is a fragmentary detail cross-section taken on the line 3—3 of Fig. 1.

Referring more in detail to the drawing, 10 indicates the casing, in general being made up of the two broad sides 11 and 12, and the other sides 13 and 14. A bottom side 15 connecting with the sides and a top 16 also connecting with the sides complete the casing 10. In the top 16 is located a lens 17 back of which is located a conventional incandescent lamp, the details of which are well known to the trade.

Journalled in the sides 11 and 12 of the casing 10 are three shafts 18, 19 and 20. Shaft 18 I have referred to, as the generator shaft to which is fixed a pinion 21. Shaft 20 is the main drive shaft, one end of which is provided with a sunken key member 22 being rotatably mounted in the sunken portion 23 of the side 12 of the casing 10. Around the shaft 20 is located a main drive spring 24 one end of said spring 24 being anchored to the bottom 15 of the casing 10, the other end being fixed to the shaft 20. In Fig. 2, I have shown the shaft end of the spring broken off for convenience. At 25, I have indicated a ratchet gear. This ratchet gear 25 is also fixed to the shaft 20. Adjacent the ratchet gear 25 is the main driving gear 26 on the side of which is pivoted a pawl member 27 adapted to engage with the teeth of the ratchet gear 25. A spring 27 is fixed in a pin 29 located in the side of the main drive gear 26 for the purpose of maintaining the pawl 27 in engagement with the ratchet teeth of the ratchet gear 25. The gear 26 is free on the shaft 20 when the spring 24 is being wound up but when the key 22 is released the ratchet gear drives the said gear 26, in the direction shown in Fig. 2, as indicated by the arrow.

On the shaft 19 is located a pinion gear 30 which is fixed to the shaft 19. Adjacent the pinion 30 and also fixed to the shaft 19 is a mutilated gear 31 and drum 32. It will be noted that the drum 32 is provided with a slot 33 into which engages a pivoted dog lever 34. The dog lever 34 is mounted on a spring 35 fixed in an extension pin 36 fixed to the casing side 12. When the dog lever 34 is in a released normal position the hooked end 37 is out of the drum slot 33 at which time the mutilated gear 31 is free to rotate and be driven, in the direction indicated, by the drive gear 26. The drum slot 33 is so positioned with respect to the mutilated gear 31 that when the hooked end 37 of the lever 34 is therein engaged the mutilated portion 38 is centered below the generator shaft pinion 21, as shown in Fig. 2. In this position, it will be apparent that the pinion 21 may rotate freely without interfering with the said mutilated gear 31. To the righthand side of the pinion 21 is located a square nut 39 which is horizontally slidable between the guide members 40 which are fixed to the side 12, the central portion of the nut 39 being threaded on the generator shaft 18, as indicated at 41. It will thus be seen that when the shaft 41 is rotated in either direction the nut 39 will slide in or out between the guide members 40. Stop pins 42 and 43 are provided on the shaft 18 at either side of the nut 39 to provide a limit of movement of the nut on the said shaft 18. A horizontally disposed pin 44 is located in the side of the nut 39 having another pin located thereon at ninety degrees, as indicated at 45. Also located in the shaft 18 is a pin 46 which is adapted to engage against the side of the pin 45 when the shaft 18 is rotating counter-clockwise, as shown in Fig. 2. The purpose of the pin 46 is to stop the pinion 21 in position wherein the teeth will be in proper position to engage with the teeth on the mutilated gear 31 at the proper time.

On the side of the mutilated gear 31, I have located a spring lever 47. The spring lever 47 engages the dog lever 34 just before the mutilated portion 38 of the gear 31 centers under the pinion 21 thereby bringing the hooked end 37 of the lever 34 into engagement with the periphery of the drum 32 and engaging the hooked portion 37 in the slot 33 of the drum 32. At this point the horizontal pin 44 in the nut 39 slides behind the upper end of the lever 34, as shown in Fig. 2.

Fixed to the generator shaft 18 is a spiral flat spring 48 which in all respects is similar to the main drive spring 26. One end of the spring 48 is fixed to the shaft 18 and the other end is fixed to the post 49 attached to the side 12. Also fixed to the shaft 18 are the two ratchet gears 50 and 51. The ratchet gear 50 is engaged by the hooked end 52 of the push button lever 53 which is pivoted at 54 to the side 12, the push button portion 54ª being located in the recessed portion 55 of the side 14. A flat spring 56 maintains the hooked portion 52 of the lever 53 in engagement with the ratchet teeth of the member 50.

The rotor 57 of the generator 58 is freely journalled on the generator shaft 18. Attached to the right-hand side of the rotor 57 is a spring pawl member 59 which engages with the ratchet teeth of the ratchet gear 51 which is fixed to the shaft 18, the ratchet teeth of the ratchet gear 51 being pitched in the same direction as the teeth on the gear 50. The rotor 57 is capable of rotating freely on the shaft 18 in direction of the arrow when the ratchet gear 51 rotates in an opposite direction or when it is at rest.

In operation, the main drive spring 24 is wound up by means of the sunken key 22, the dog lever 34 maintaining the mutilated gear 31 in the position shown in Fig. 2.

In the initial stage of operation, the generator shaft spring 48 will be in wound condition when the dog lever 34 is in the position shown in Fig. 2. In this position the push button lever is as shown in Fig. 2, the hooked end 52 engaging the teeth of the ratchet gear 50 thereby preventing the generator shaft 18 from rotating. In the position above described, the flashlight is ready to operate.

To operate the flashlight, the push button 54ª is depressed immediately releasing the ratchet gear 50. The ratchet gear 50 being fixed to the shaft 18 instantly starts rotating in the direction of the arrow shown in Fig. 2. Due to the fact that the spring pawl 59 is engaged against the teeth of the ratchet gear 51 also fixed to the generator shaft 18, the other end of which is fixed to the rotor 57 of the generator, the rotor is spun on the generator shaft 18 at high speed.

As the generator shaft 18 rotates, the nut 39 feeds to the right-hand side, as viewed in Fig. 1, and when the pin 44 on the nut 39 moves from under the upper end of the dog lever 34 the spring 35 pulls the hooked end 37 out of engagement with the slot 33 in the drum 32 thereby releasing the mutilated gear 31 which is driven by the main drive spring 24. At this point the rotor 57 has been driven at high speed in the direction of the arrow by means of the wound up generator shaft spring 48. The pin 43 on the generator shaft 18 limits the motion of the nut 39 to the right and stops the rotation of the shaft 18 but the spring pawl 59 connecting the rotor 57 with the stopped ratchet gear 51 continues to rotate over the ratchet teeth thereby allowing the rotor to rotate freely on the shaft 18. The generator 58 furnishes electrical current to illuminate the incandescent lamp of the device in the conventional manner.

Assuming that the release button 54ª is maintained in a depressed position, and the nut pin 44 has been withdrawn from behind the lever 34, as aforesaid, the mutilated gear 31 under pressure of the main drive spring 24 engages the teeth of the fixed pinion 21 and rotates in the direction of the arrow shown in Fig. 2 thereby rotating the pinion 21 in a reverse direction winding up the drive shaft spring 48. During this operation, the nut 39 moves to the left-hand side, as viewed in Fig. 1. When the spring member 47 located on the side of the mutilated gear 31 contacts the right-hand side of the dog lever 34 just before a complete revolution has been made, the hooked end 37 bears against the periphery of the drum 32 and when the drum regains the position shown in Fig. 2, the hooked end 37 drops into the drum slot 33 thereby stopping the movement of the mutilated gear 31. Just before the hooked end 37 of the lever 34 drops in the drum slot 33, the nut pin 44 is ready to slide under the upper end of the lever 34 and actually slides under this lever when the lever drops into engagement with the said slot 33.

Located on the nut pin 44 is a right-angled projecting pin 45, and on the generator shaft 18 is a pin 46. These two pins are provided for the purpose of stopping the pinion 21 in an approximate position such that the pinion teeth will be located in the right position with respect to the teeth on the mutilated gear 31 for proper engagement when the mutilated gear is released for another revolution.

So long as the button 54 is maintained in a depressed position this operation will be continued until the main spring 24 has been unwound and its energy expended, the generator drive shaft spring 49 being re-energized from time to time, and the rotor 57 being continuously driven in the direction of the arrow.

It is to be understood that the generator shaft spring 48 is very much lighter than the main spring 24, but it should also be understood that the generator shaft 18 is freely journalled in the casing 10 so that when the button 54ª is depressed and the ratchet gear 50 is released instant movement is imparted to the rotor 57 of the generator thereby producing instant light in the conventional incandescent lamp, and when the shaft and ratchet gears 50 and 51 are stopped, the momentum set up in the rotor 57 continues to rotate it at high speed until the next impulse is furnished by the rewound spring 48.

It will also be apparent that by releasing the button 54ª, the ratchet gear 50 is immediately stopped thereby discontinuing further motion of the geared mechanism or rotation of the generator shaft 18. In such position the flashlight is ready for instant operation at any time. Also the main spring 24 may be of powerful design to the effect that with one winding, the flashlight can be operated over a considerable period of time as the generator shaft spring 48 can be energized many times with one winding of the main spring 24.

It is also to be understood that while I have shown the apparatus somewhat in detail with respect to certain portions yet I may vary the construction within certain limits as to mechanical design, or such limits as to better coincide with shop practice, etc., without departing from the spirit of the invention.

Having thus described my invention, what I claim as new is:

1. An improved batteryless flashlight comprising in combination, a casing having a flashlight lens located on one end and a winding key and release button located in the sides thereof, a main drive spring attached to a main drive shaft both of which are fixed to said winding key, a ratchet member fixed to said main drive shaft and a main drive gear journalled on said main drive shaft, a ratchet pawl member pivoted to the said main drive gear and engaging against said ratchet member, a mutilated gear located in said casing being driven by said main drive shaft gear, a drum fixed to said mutilated gear on one side thereof, the said drum having a slot located across the face thereof, an electric generator located in said casing being freely journalled in its rotor portion on a generator drive shaft, a ratchet gear fixed to said generator drive shaft, a spring pawl member attached to the side of said rotor, one end of said rotor pawl engaging ratchet teeth on said generator shaft ratchet member, a release button lever pivoted in said casing and having a hooked end engaging with ratchet teeth located in the face of said generator drive shaft ratchet member, a spring located around said generator drive shaft, one end of said generator shaft spring being anchored to said generator shaft and the other end being anchored to said casing, a pinion fixed to said generator drive shaft engaging with said mutilated gear when said mutilated gear is in position to engage with said pinion, a slide member threaded to said generator drive shaft and having a stop pin located in its side facing said pinion, the said slide member being threaded on the said generator drive shaft, a dog lever pivoted in said casing having a hooked end located over the face of said mutilated gear drum, a spring lever fixed to said mutilated gear for the purpose of engaging said dog lever and depressing its hooked end into engagement with the slot located in its face and thereby raising the opposite end of the said dog lever for the purpose of engaging the slide member stop pin thereunder, means for positioning the said generator drive shaft pinion with respect to said mutilated gear located on said generator shaft and said slide member stop pin.

2. An improved batteryless flashlight comprising in combination, a casing having an incandescent lamp located in one end and electrically connected with a generator, a generator shaft journalled in said casing, a generator rotor freely journalled on said shaft, a ratchet member fixed on said shaft, a pawl attached to said rotor and engaging with said ratchet member, a spiral spring located around said shaft one end being fixed to said shaft and the other end being anchored to said casing, a pinion fixed on said shaft, a slidable nut member located in said casing and threadably engaged with said shaft, stop members located on said nut and said shaft, a mutilated gear journalled on a second shaft pivoted in said casing the said mutilated gear engaging with said pinion during a portion of one revolution of said gear being out of engagement with said pinion in its mutilated area, a slotted drum attached to said mutilated gear being rotatable with said second shaft, a main spring and gear drive engaging with a pinion fixed to said mutilated gear, a pivoted lever located in said casing one end engaging with the slot of said slotted drum, the said lever end being normally out of engagement, a spring lever attached to said mutilated gear and engaging against said pivoted lever for the purpose of engaging said lever with said drum when the mutilated portion of said gear is adjacent the said pinion on the said generator shaft, one end of said pivoted lever engaging one of the stop members when the said nut moves to one side of said generator shaft, a pivoted push button pawl lever normally engaging with the ratchet member located on said generator shaft.

3. An improved batteryless flashlight comprising in combination, a casing housing a main drive spring and connected drive gears including a mutilated gear, a generator located in casing for the purpose of generating electricity for a connected incandescent lamp mounted in said casing, a reversible generator shaft located in said casing and a generator rotor freely journalled on said generator shaft, a spring attached to said generator shaft for the purpose of driving said rotor in one direction, a ratchet member fixed to said generator shaft for the purpose of holding said generator shaft spring in a wound condition, a pawl engaging said ratchet member having one end attached to said generator rotor for the purpose of driving said rotor when said ratchet is free to be driven by said generator shaft spring, a threaded nut located on said generator shaft being slidable in said casing, a generator shaft drive pinion fixed to the generator shaft for the purpose of winding said generator shaft spring when the said mutilated gear is in engagement with said pinion, a dog lever pivoted in said casing having one end engageable with a slotted member located on said mutilated gear, said dog lever member normally being disengaged with the said slotted member, a lever located on said mutilated gear for the purpose of engaging said dog lever with said slotted member when the mutilated portion of said mutilated gear is adjacent the said generator shaft pinion, stop members located on said nut and shaft for the purpose of stopping said generator shaft and holding said dog lever in engagement with said mutilated gear slotted member, a push button pawl release member engaging with said ratchet member.

GEORGE W. ALEXANDER.